United States Patent [19]

Iimura et al.

[11] Patent Number: 4,905,619
[45] Date of Patent: Mar. 6, 1990

[54] ELECTRONIC SEWING MACHINE

[75] Inventors: Ikuro Iimura, Kanagawa; Haruo Iwabuchi; Fumio Wada, both of Tokyo, all of Japan

[73] Assignee: Juki Corporation, Chofu, Japan

[21] Appl. No.: 206,652

[22] Filed: Jun. 14, 1988

[30] Foreign Application Priority Data

Jan. 30, 1988 [JP] Japan ................................ 63-21097

[51] Int. Cl.⁴ .............................................. D05B 3/02
[52] U.S. Cl. .................................................. 112/453
[58] Field of Search ............... 112/453, 456, 457, 458, 112/454, 121.11, 121.12

[56] References Cited

U.S. PATENT DOCUMENTS

| | | | |
|---|---|---|---|
| 3,855,956 | 12/1974 | Wurst | 112/453 |
| 4,141,305 | 2/1979 | Takenoya et al. | 112/456 |
| 4,222,339 | 9/1980 | Iwako | 112/456 |
| 4,227,472 | 10/1980 | Bergvall | 112/456 |
| 4,522,137 | 6/1985 | Takenoya et al. | 112/453 X |
| 4,590,881 | 5/1986 | Wada | 112/456 |

Primary Examiner—Peter Nerbun
Attorney, Agent, or Firm—Fitch, Even, Tabin & Flannery

[57] ABSTRACT

This invention relates to an electronic sewing machine in which sewing data consisting of the needle sewing positions encoded for each stitch of a predetermined stitch pattern is stored. It comprises at least a memory for storing sewing data consisting of the encoded stitch data in group in regard to the stitches the needle sewing positions of which change regularly and the read out time data which instructs the reading out of the encoded stitch data by the number of times equal to the number of stitches encoded in group. This composition is effective not only in reducing the capacity required for storing stitch data but also shortening the time required to process the stitch data.

2 Claims, 17 Drawing Sheets

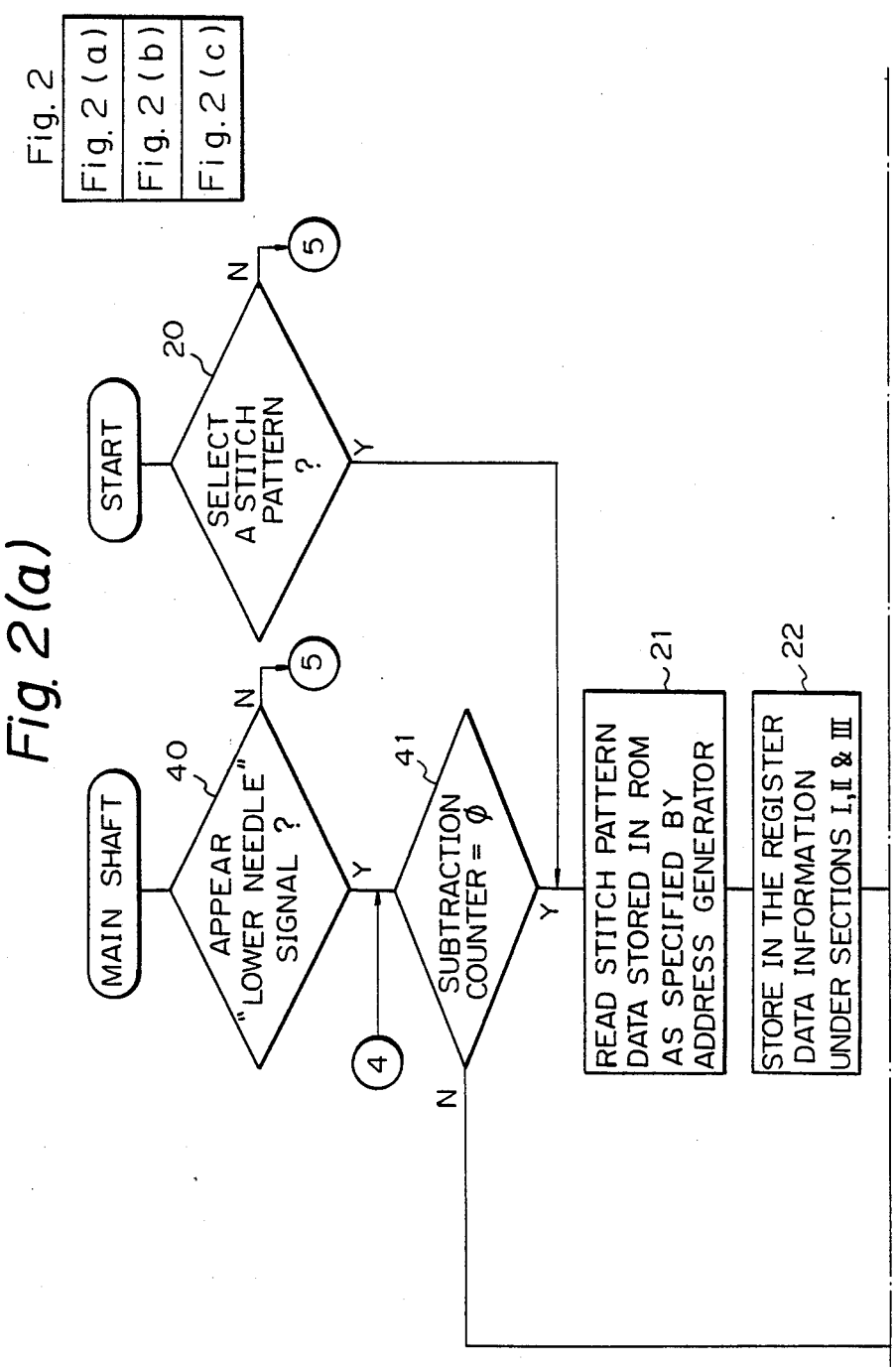

| Stitch Number | (10) | (9) | (8) | (7) | (6) | (5) | (4) | (3) | (2) | (1) |
|---|---|---|---|---|---|---|---|---|---|---|
| 0 | 0 | 0 | 0 | 0 | 0 | 0 | 0 | 0 | 0 | 1 |
| 1 | 0 | 0 | 0 | 0 | 0 | 0 | 0 | 0 | 0 | 1 |
| 2 | 0 | 0 | 0 | 0 | 0 | 0 | 0 | 0 | 0 | 1 |
| 3 | 0 | 0 | 0 | 0 | 0 | 0 | 0 | 0 | 0 | 1 |
| 4 | 0 | 0 | 0 | 0 | 0 | 0 | 0 | 0 | 1 | 0 |
| 5 | 0 | 0 | 0 | 0 | 0 | 0 | 0 | 0 | 0 | 1 |
| 6 | 0 | 0 | 0 | 0 | 0 | 0 | 0 | 0 | 1 | 0 |
| 7 | 0 | 0 | 0 | 0 | 0 | 0 | 1 | 0 | 0 | 0 |
| 8 | 0 | 0 | 0 | 0 | 0 | 1 | 0 | 0 | 0 | 0 |
| 9 | 0 | 0 | 0 | 0 | 0 | 0 | 1 | 0 | 0 | 0 |
| 10 | 0 | 0 | 0 | 0 | 0 | 1 | 0 | 0 | 0 | 0 |
| 11 | 0 | 0 | 0 | 0 | 0 | 0 | 1 | 0 | 0 | 0 |
| 12 | 0 | 0 | 0 | 0 | 0 | 1 | 0 | 0 | 0 | 0 |
| 13 | 0 | 0 | 0 | 0 | 0 | 0 | 1 | 0 | 0 | 0 |
| 14 | 0 | 0 | 0 | 0 | 0 | 0 | 1 | 0 | 0 | 0 |
| 15 | 0 | 0 | 0 | 0 | 0 | 1 | 0 | 0 | 0 | 0 |
| 16 | 0 | 0 | 0 | 0 | 0 | 0 | 1 | 0 | 0 | 0 |
| 17 | 0 | 0 | 0 | 0 | 0 | 1 | 0 | 0 | 0 | 0 |
| 18 | 0 | 0 | 0 | 1 | 0 | 0 | 0 | 0 | 0 | 0 |
| 19 | 0 | 0 | 0 | 0 | 0 | 1 | 0 | 0 | 0 | 0 |
| 20 | 0 | 0 | 0 | 1 | 0 | 0 | 0 | 0 | 0 | 0 |
| 21 | 0 | 1 | 0 | 0 | 0 | 0 | 0 | 0 | 0 | 0 |
| 22 | 0 | 0 | 0 | 1 | 0 | 0 | 0 | 0 | 0 | 0 |
| 23 | 0 | 1 | 0 | 0 | 0 | 0 | 0 | 0 | 0 | 0 |
| 24 | 1 | 0 | 0 | 0 | 0 | 0 | 0 | 0 | 0 | 0 |
| 25 | 0 | 1 | 0 | 0 | 0 | 0 | 0 | 0 | 0 | 0 |
| 26 | 1 | 0 | 0 | 0 | 0 | 0 | 0 | 0 | 0 | 0 |
| 27 | 1 | 0 | 0 | 0 | 0 | 0 | 0 | 0 | 0 | 0 |
| 28 | 1 | 0 | 0 | 0 | 0 | 0 | 0 | 0 | 0 | 0 |
| 29 | 1 | 0 | 0 | 0 | 0 | 0 | 0 | 0 | 0 | 0 |
| 30 | 1 | 0 | 0 | 0 | 0 | 0 | 0 | 0 | 0 | 0 |

(c)

| III | | | | | | | | | | II | | I | | |
|---|---|---|---|---|---|---|---|---|---|---|---|---|---|---|
| 0 | 0 | 0 | 0 | 0 | 0 | 0 | 0 | 1 | 0 | 1 | 0 | 0 | ($a_1$) |
| 0 | 0 | 0 | 0 | 0 | 0 | 0 | 1 | 1 | 0 | 0 | 1 | 1 | ($a_2$) |
| 0 | 0 | 0 | 0 | 1 | 1 | 0 | 0 | 0 | 1 | 1 | 0 | 1 | ($a_3$) |
| 0 | 0 | 0 | 0 | 0 | 1 | 0 | 0 | 0 | 0 | 0 | 1 | 1 | ($a_4$) |
| 0 | 0 | 0 | 0 | 1 | 1 | 0 | 0 | 0 | 0 | 0 | 1 | 1 | ($a_5$) |
| 0 | 0 | 0 | 1 | 0 | 1 | 0 | 0 | 0 | 0 | 0 | 1 | 1 | ($a_6$) |
| 0 | 1 | 0 | 1 | 0 | 0 | 0 | 0 | 0 | 0 | 0 | 1 | 1 | ($a_7$) |
| 1 | 1 | 0 | 0 | 0 | 0 | 0 | 0 | 0 | 0 | 0 | 1 | 1 | ($a_8$) |
| 1 | 0 | 0 | 0 | 0 | 0 | 0 | 0 | 0 | 0 | 1 | 0 | 0 | ($a_9$) |
| 0 | 0 | 0 | 0 | 0 | 0 | 0 | 0 | 0 | 0 | 0 | 0 | 0 | ($a_{10}$) |

Fig. 4

| (STITCH NUMBER) | (NEEDLE SWING POSITION) |
|---|---|
| | 64 63 62 61 ---- 10 9 8 7 6 5 4 3 2 1 |
| 0 | 0 0 0 0 ---- 0 0 0 0 0 0 0 0 0 1 |
| 1 | 0 0 0 0 ---- 0 0 0 0 0 0 0 0 0 1 |
| 2 | 0 0 0 0 ---- 0 0 0 0 0 0 0 0 0 1 |
| 3 | 0 0 0 0 ---- 0 0 0 0 0 1 0 0 0 0 |
| 4 | 0 0 0 0 ---- 0 0 0 0 0 0 0 0 0 0 |
| 5 | 0 0 0 0 ---- 0 0 1 0 0 0 0 0 0 0 |
| --- | |

Fig. 5

| (NEEDLE SWING POSITION) (LARGE DATA) | 1 2 3 4 5 6 7 8 | 9 10 11 12 13 14 15 16 17 |
|---|---|---|
| | 0 | 1 |
| (SMALL DATA) | 1 2 3 4 5 6 7 8 | 1 2 3 4 5 6 7 8 |

| 48 49 50 51 52 53 54 55 56 57 58 59 60 61 62 63 64 |
|---|
| 6 | 7 |
| 8 1 2 3 4 5 6 7 8 1 2 3 4 5 6 7 8 |

Fig. 6

⇦ STITCH PATTERN DATA (NEEDLE SWING POSITION)

| (LARGE DATA) \ SMALL DATA | 1 | 2 | 3 | 4 | 5 | 6 | 7 | 8 (bit) |
|---|---|---|---|---|---|---|---|---|
| 0 | | | | | | | | |
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |
| | 57 | 58 | 59 | 60 | 61 | 62 | 63 | 64 |

Fig. 7

| STITCH NUMBER | NEEDLE SWING POSITION | SMALL DATA 8 | 7 | 6 | 5 | 4 | 3 | 2 | 1 | LARGE DATA |
|---|---|---|---|---|---|---|---|---|---|---|
| 0 | 1 | 0 | 0 | 0 | 0 | 0 | 0 | 0 | 1 | 0 |
| 1 | 1 | 0 | 0 | 0 | 0 | 0 | 0 | 0 | 1 | 0 |
| 2 | 1 | 0 | 0 | 0 | 0 | 0 | 0 | 0 | 1 | 0 |
| 3 | 1 | 0 | 0 | 0 | 0 | 0 | 0 | 0 | 1 | 0 |
| 4 | 9 | 0 | 0 | 0 | 0 | 0 | 0 | 0 | 1 | 1 |
| 5 | 2 | 0 | 0 | 0 | 0 | 0 | 0 | 1 | 0 | 0 |
| 6 | 9 | 0 | 0 | 0 | 0 | 0 | 0 | 0 | 1 | 1 |
| 7 | 25 | 0 | 0 | 0 | 0 | 0 | 0 | 0 | 1 | 3 |
| 8 | 35 | 0 | 0 | 0 | 0 | 0 | 1 | 0 | 0 | 4 |
| 9 | 25 | 0 | 0 | 0 | 0 | 0 | 0 | 0 | 1 | 3 |
| 10 | 35 | 0 | 0 | 0 | 0 | 0 | 1 | 0 | 0 | 4 |
| 11 | 25 | 0 | 0 | 0 | 0 | 0 | 0 | 0 | 1 | 3 |

Fig. 8

| | III | | | | | | | | I | II | | |
|---|---|---|---|---|---|---|---|---|---|---|---|---|
| STITCH NUMBER | SMALL DATA BIT 8 | 7 | 6 | 5 | 4 | 3 | 2 | 1 | DIRECTION | READING TIMES | | |
| 0~3 | 0 | 0 | 0 | 0 | 0 | 0 | 0 | 1 | 0 | 1 | 0 | 0 |
| 4~6 | 0 | 0 | 0 | 0 | 0 | 0 | 1 | 1 | 0 | 0 | 1 | 1 |
| 7~11 | 0 | 0 | 0 | 0 | 0 | 0 | 0 | 1 | 1 | 1 | 0 | 1 |

Fig. 9

| 8 7 | 6 5 4 | 3 2 1 |
|---|---|---|
| INSTRUCTION BIT | DATA II or READING TIMES | DATA I |

0  0  ⇨ GENERATING DATA I, DATA II 0  1  ⇨ GENERATING DATA I BY READING TIMES

Fig. 10

| | STITCH NUMBER | INSTRUCTION BIT | | DATA II/READING DATA I TIMES | | | DATA I | | |
|---|---|---|---|---|---|---|---|---|---|
| (b) | 0 ~ 3 | 0 | 1 | 1 | 0 | 0 | 0 | 0 | 0 |
| (b) | 4, 5 | 0 | 0 | 0 | 0 | 0 | 0 | 0 | 1 |
| (b) | 6, 7 | 0 | 0 | 0 | 1 | 1 | 0 | 0 | 1 |
| (b) | 8, 9 | 0 | 0 | 0 | 1 | 1 | 1 | 0 | 0 |
| (b) | 10, 11 | 0 | 0 | 0 | 1 | 1 | 1 | 0 | 0 |

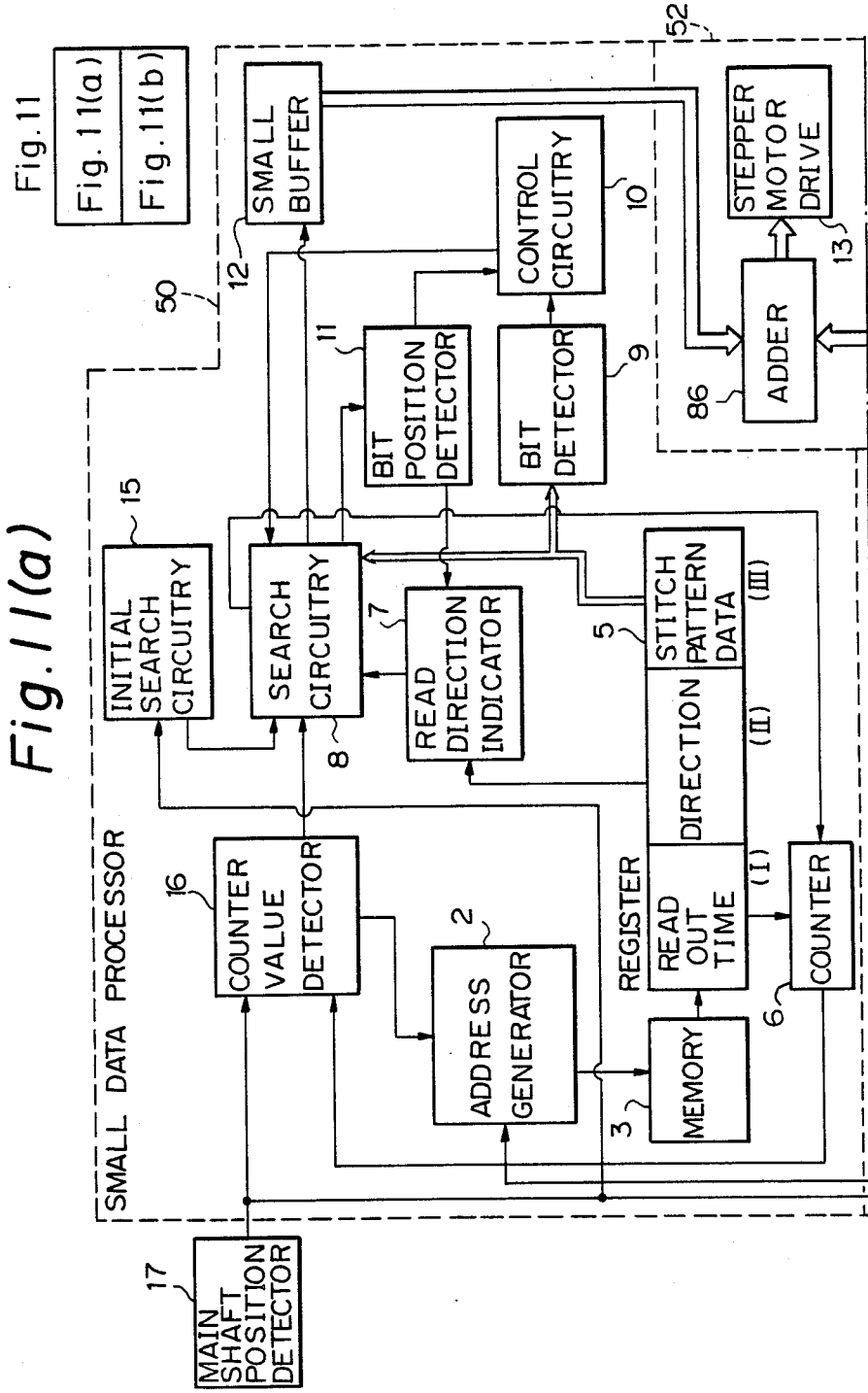

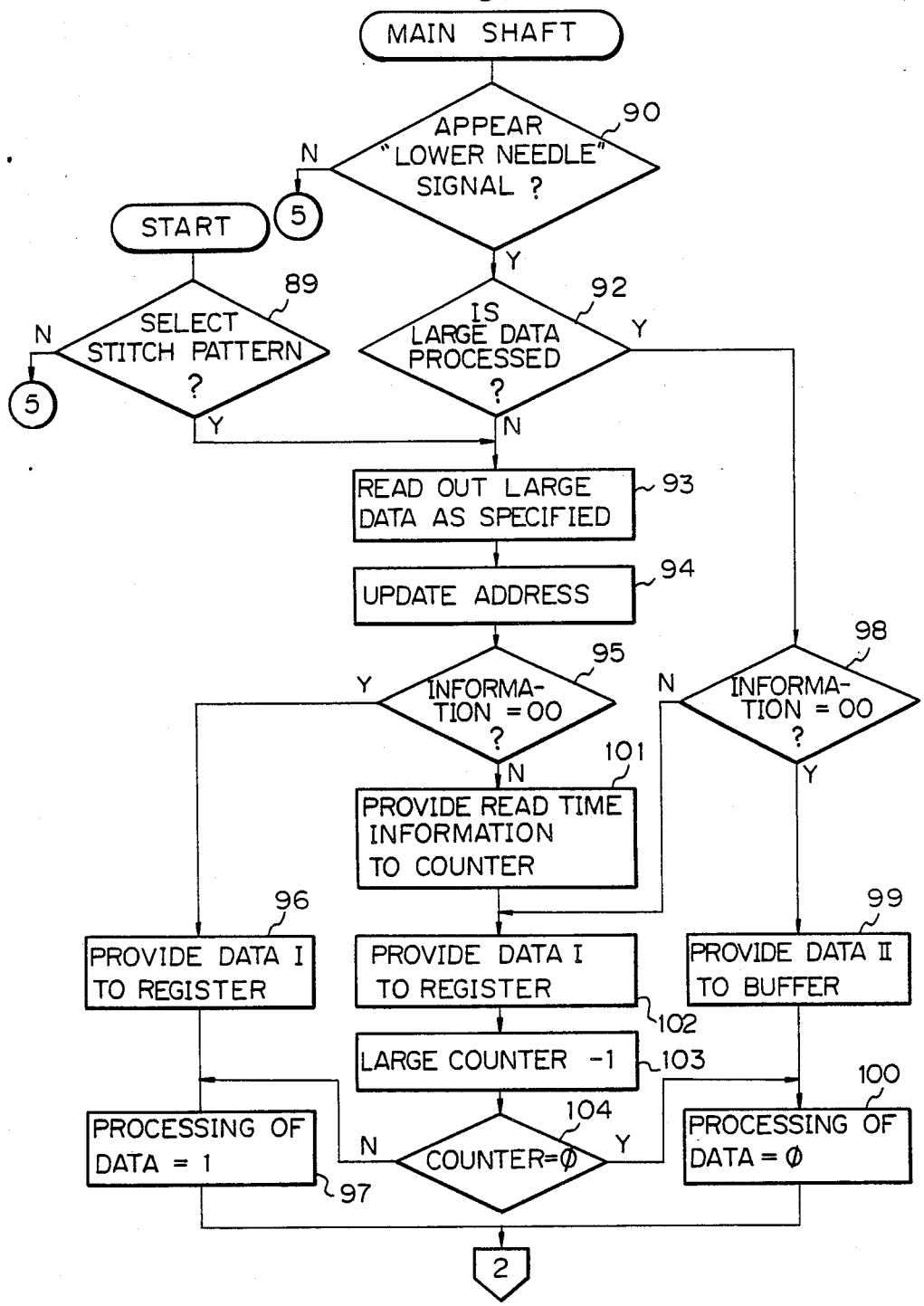

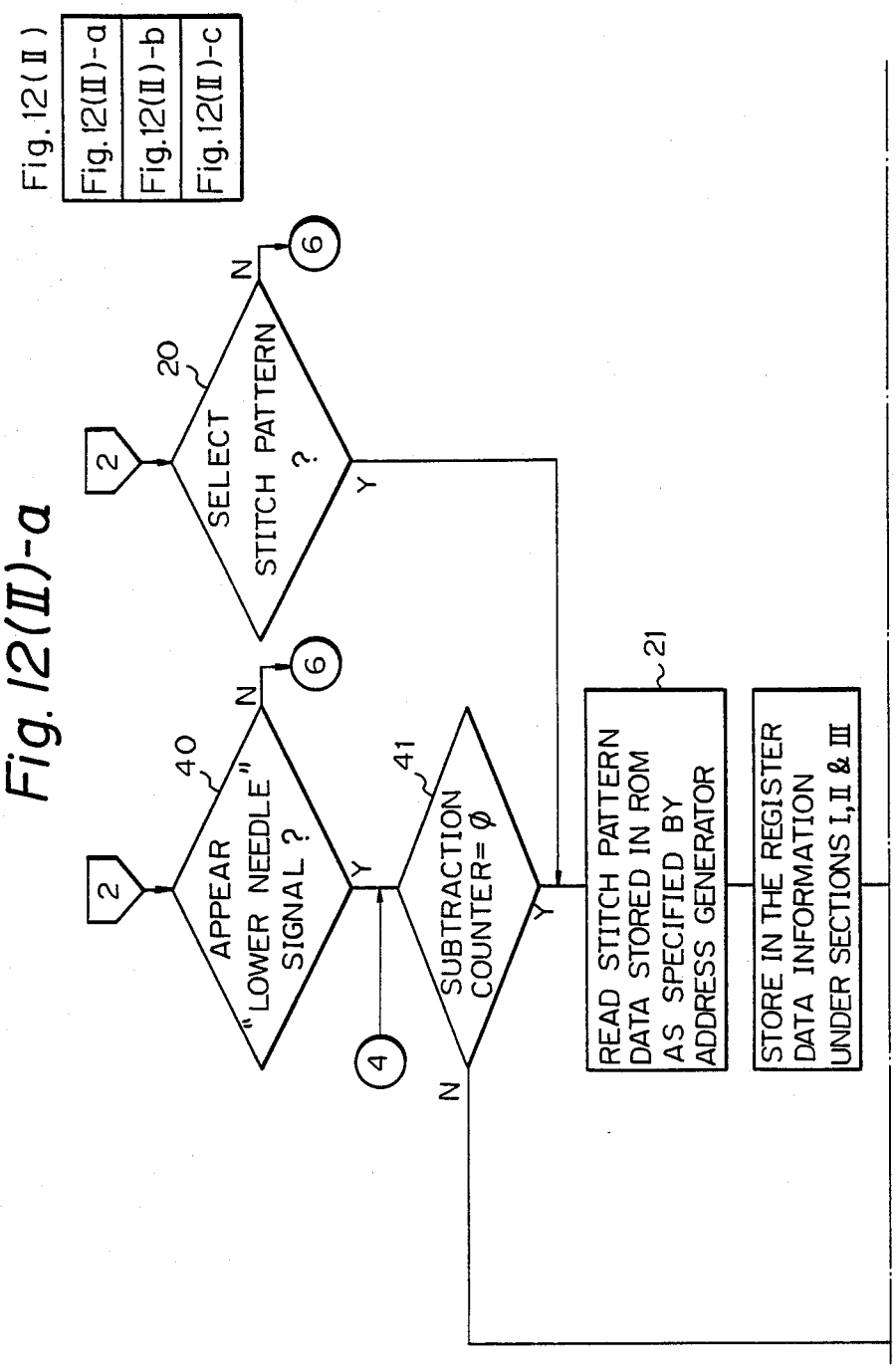

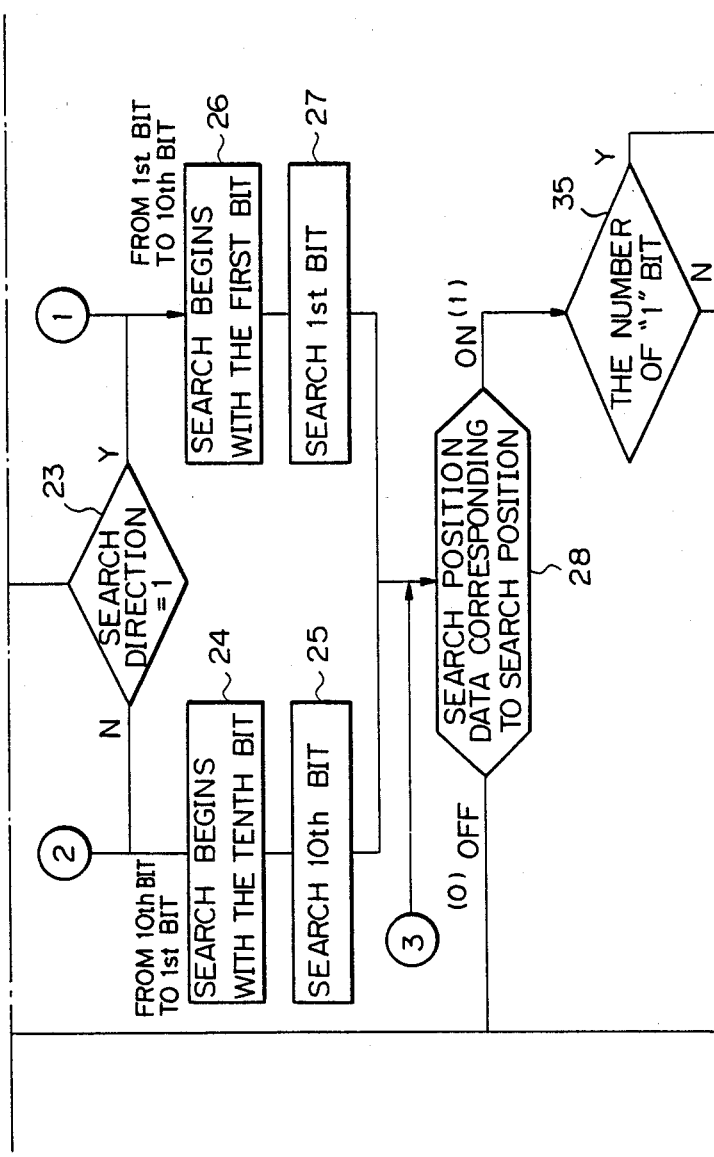
Fig. 12(II)-b

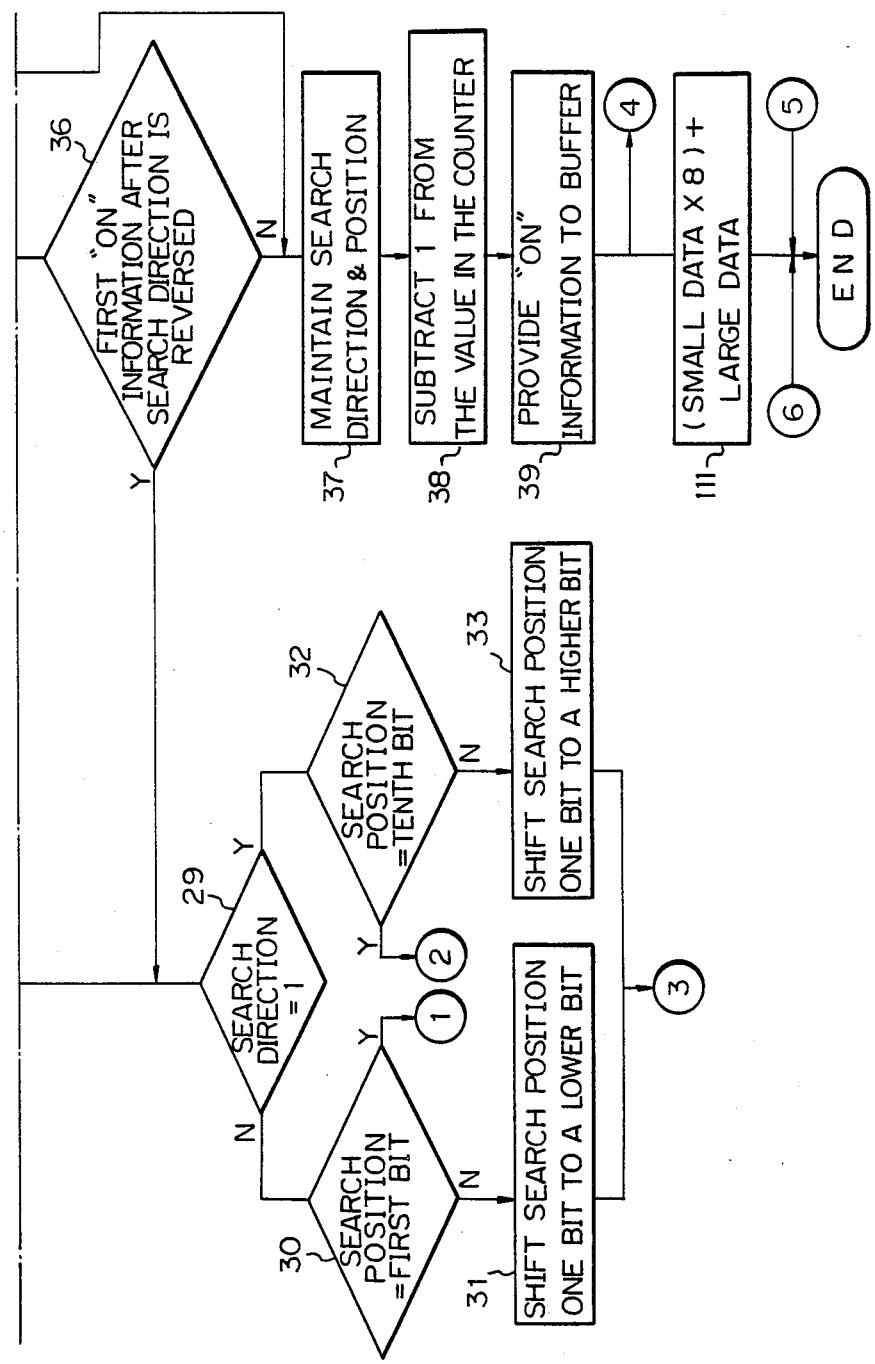
Fig.12(II)-c

QUANTITY OF FEEDING

|   | (10)(9)(8)(7)(6)(5)(4)(3)(2)(1) |
|---|---|
| 0 | 0 0 0 0 0 0 0 0 1 0 |
| 1 | 0 0 0 0 0 0 0 1 0 0 |
| 2 | 0 0 0 0 1 0 0 0 0 0 |
| 3 | 0 0 0 0 1 0 0 0 0 0 |
| 4 | 0 0 0 0 0 0 0 0 1 0 |
| 5 | 1 0 0 0 0 0 0 0 0 0 |
| 6 | 0 0 0 0 0 0 0 0 1 0 |
| 7 | 0 1 0 0 0 0 0 0 0 0 |
| 8 | 1 0 0 0 0 0 0 0 0 0 |
| 9 | 0 0 0 0 0 0 0 0 1 0 |
| 10 | 1 0 0 0 0 0 0 0 0 0 |
| 11 | 0 0 0 0 0 0 0 0 1 0 |
| 12 | 0 0 0 0 0 0 0 1 0 0 |
| 13 | 0 1 0 0 0 0 0 0 0 0 |
| 14 | 0 0 0 0 0 0 0 1 0 0 |
| 15 | 0 0 0 0 0 0 0 1 0 0 |
| 16 | 0 1 0 0 0 0 0 0 0 0 |
| 17 | 0 0 0 0 0 0 0 1 0 0 |
| 18 | 0 0 0 0 1 0 0 0 0 0 |
| 19 | 0 0 0 0 1 0 0 0 0 0 |
| 20 | 0 0 0 0 1 0 0 0 0 0 |
| 21 | 1 0 0 0 0 0 0 0 0 0 |
| 22 | 0 0 0 0 0 0 0 0 0 0 |
| 23 | 1 0 0 0 0 0 0 0 0 0 |
| 24 | 0 1 0 0 0 0 0 0 0 0 |
| 25 | 0 0 0 0 0 0 0 1 0 0 |
| 26 | 0 1 0 0 0 0 0 0 0 0 |
| 27 | 0 0 0 0 1 0 0 0 0 0 |
| 28 | 0 0 0 0 1 0 0 0 0 0 |
| 29 | 0 0 0 0 0 0 0 0 0 1 |
| 30 | 0 0 0 0 0 0 0 0 1 0 |

STITCH NUMBER

(b)

| 0 0 0 0 1 0 0 1 1 0 | 1 | 0 1 1 |
|---|---|---|
| 0 0 0 0 1 0 0 0 1 0 | 0 | 0 1 0 |
| 1 0 0 0 0 0 0 0 1 0 | 0 | 0 1 0 |
| 1 1 0 0 0 0 0 0 0 0 | 1 | 0 1 0 |
| 1 0 0 0 0 0 0 0 1 0 | 1 | 0 1 1 |
| 0 1 0 0 0 0 0 1 0 0 | 1 | 0 1 1 |
| 0 1 0 0 0 0 0 1 0 0 | 1 | 0 1 1 |
| 0 0 0 0 1 0 0 0 0 0 | 0 | 0 1 1 |
| 1 0 0 0 0 0 0 0 1 0 | 0 | 0 1 1 |
| 0 1 0 0 0 0 1 0 0 0 | 0 | 0 1 1 |
| 0 0 0 0 1 0 0 0 0 0 | 1 | 0 1 0 |
| 0 0 0 0 0 0 0 0 1 1 | 1 | 0 1 0 |
| 0 0 0 0 0 0 0 0 0 0 | 0 | 0 0 0 |

III　II　I

ELECTRONIC SEWING MACHINE

BACKGROUND OF THE INVENTION

1. Field of the Invention

The present invention relates to sewing machines, and more particularly to an electronic sewing machine suited for embroidering a workpiece.

2. Description of the Related Art

A conventional sewing machine typically includes two different cam mechanisms, one for imparting lateral jogging movement to a needle and the other for feeding a workpiece or cloth. These two cam mechanisms must be used selectively to provide a desired stitch pattern. It is for this reason that formation of a complicated stitch pattern requires cam mechanisms of a complicated structure. Such complicated cam mechanisms are difficult to manufacture.

U.S. Pat. No. 3,855,956 discloses an improved sewing machine wherein digital information of needle swing position for each stitch of a predetermined stitch pattern is stored in a static memory or ROM. This information is, then, read out by addressing the memory with the output of counter which counts up pulses from a pulse generator driven in timed relation with the sewing machine and so adds one pulse for each stitch made. There is, however, a disadvantage to this system in that a large capacity is necessary for storing many different stitch data.

SUMMARY OF THE INVENTION

It is, therefore, an object of this invention to provide an electronic sewing machine which can substantially reduce the necessary space for storing stitch patterns, as well as the processing time.

It is another object of the invention to provide an electronic sewing machine which does not require separate cams for each different stitch pattern.

BRIEF DESCRIPTION OF THE DRAWINGS

A better understanding of the invention will be gained by referring to the following description, taken in conjunction with the accompanying drawings, in which:

FIG. 2; FIG. 2(a)

FIG. 3 portion (b) is a table of encoded data for producing the stitch pattern shown in FIG. 3a;

FIG. 3 portion (c) is a table of encoded data prepared according to the teaching of the present invention;

FIG. 4 is a table on encoded data used for a second embodiment of the invention;

FIG. 5 is a representation of small and large data;

FIG. 6 is a representation of small and large data in a matrix form;

FIG. 7 shows stitch data which includes the small and large data;

FIG. 8 is a table of an encoded small data;

FIG. 9 shows the structure of the large data;

FIG. 10 is a table of an encoded large data;

FIG. 11; FIG. 11(a) and FIG. 11(b) is a block diagram of the second embodiment of the invention;

FIG. 12 (FIG. 12(I); FIG. 12(II)-a; FIG.12(II)-b; FIG. 12(II)-c is a flow chart for implementation in the second embodiment shown in FIG. 11;

FIG. 13 portion (a) is a table of encoded data showing feed coordinates for each stitch; and FIG. 13 portion (b) is a table of encoded data as prepared according to the teaching of the present invention.

DESCRIPTION OF THE PREFERRED EMBODIMENTS

An electronic sewing machine in accordance with one embodiment of the present invention includes a stepper motor adapted to control mechanisms for imparting lateral jogging movement to a needle and for feeding a workpiece, as is well known in the art.

Figure 1:
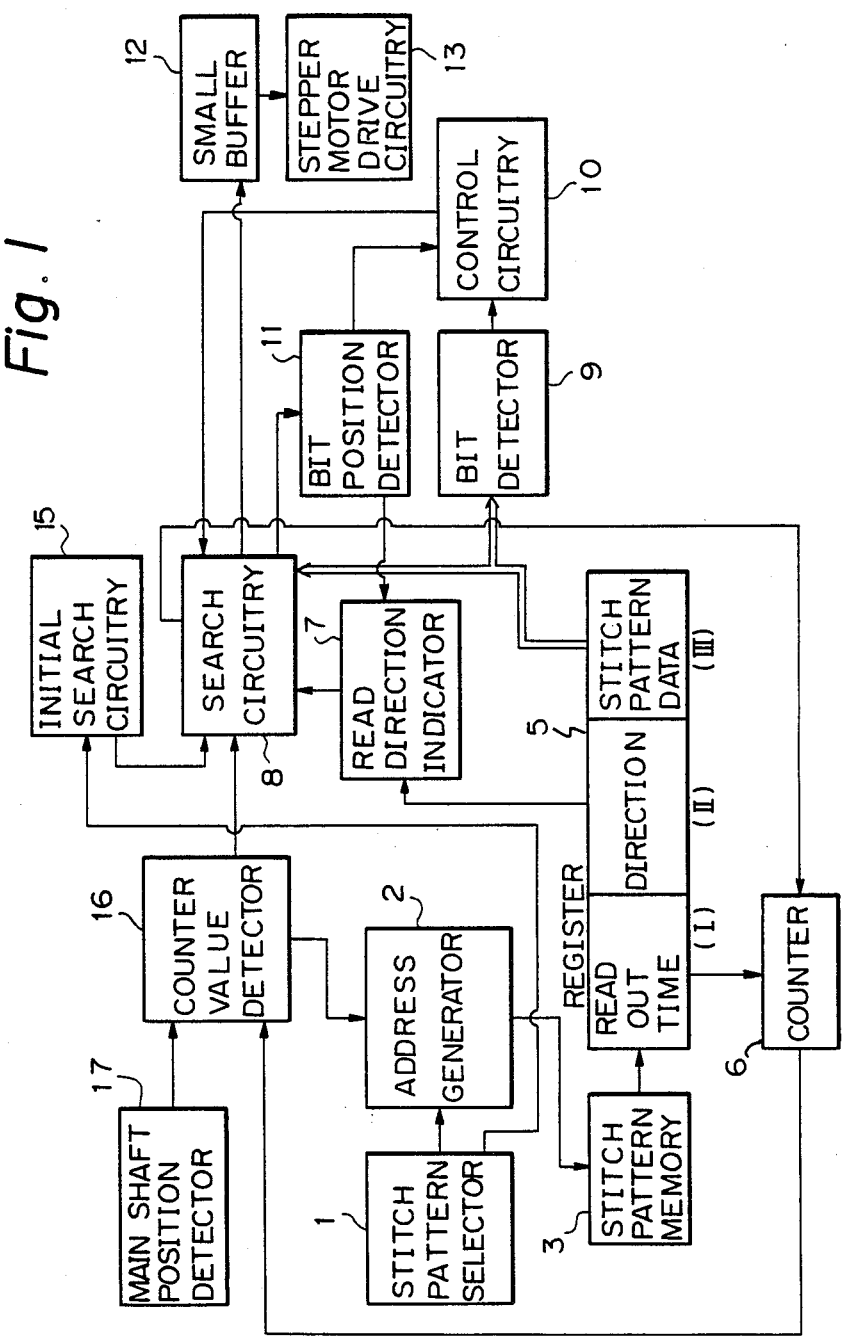
FIG. 1 is a block diagram according to a first embodiment of the invention.

Referring now to FIG. 1, the output of a stitch pattern selector 1 is connected to an address generator 2, the output of which is, in turn, connected to a stitch pattern memory 3. The stitch pattern memory 3 has an output connected to the input of a register 5. The register 5 includes three different sections, namely, Sections I, II and III, and data information contained in Sections I, II and III is loaded into a counter 6, a read direction indicator 7, and search circuitry 8, respectively. Also, the data information contained in Section III is forwarded to a bit detector 9. The output of the bit detector 9 is connected to the input of control circuitry 10, the output of which is, in turn, connected to the search circuitry 8. The output of the search circuitry 8 is also connected to the counter 6, the bit position detector 11 and a buffer 12. The output of the buffer 12 is connected to the input of a drive mechanism 13.

The output of the stitch pattern selector 1 is also connected to the input of initial search circuitry 15, the output of which is, in turn, connected to the search circuitry 8. The output of the counter 6 is connected to the input of a counter value detector 16. The output of a main shaft position detector 17 is also connected to the input of the counter value detector 16. The output of the counter value detector 16 is connected to the inputs of the search circuitry 8 and the address generator 2. The output of the bit position detector 11 is connected to the inputs of the read direction indicator 7 and the control circuitry 10.

Figure 3A:
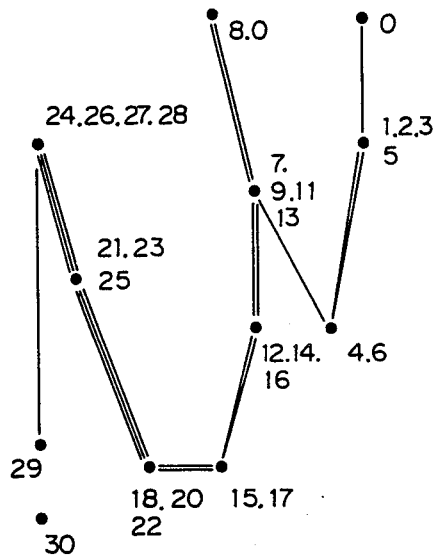
FIG. 3(a) is a representation of a stitch pattern " ʃ " chosen for illustrative purposes.

FIG. 3(a) is a representation of stitch pattern " ʃ ", a typical Japanese character, but shown as being rotated through 90° from its normal position. Each of numbers 1 to 30 represents a stitch number, and this pattern thus has 31 points of needle penetration. Numbers 1 to 10 represent needle swing positions for the needle penetration in each stitch.

FIG. 3 portion (b) is a table of encoded data for producing the 31 points of needle penetration of the " ʃ " pattern. Each code includes 10 bits as there are 10 possible needle swing positions. A binary numeral "1" appears in a specific bit where the needle swing position for a stitch is to be effected. For example, the needle swing positions for zero to the third stitches are all position 1 as shown in FIGS. 3(a) and 3 portion (b), and a binary numeral "1" thus appears in the first bit. The needle swing position for the fourth stitch is position 2, and a binary numeral "1" thus appears in the second bit. The remaining needle swing position code words for each needle swing position necessary to produce the selected pattern are formed in the same manner.

Conventionally, these digital information are stored for each stitch and read out in sequence, as shown in FIG. 3 portion (b). As stated earlier, this conventional system requires a large space for the storage of the data.

FIG. 3 portion (c) is a table of encoded data prepared according to the teaching of the present invention. In the illustrated embodiment, each code consists of 14 bits in all, 3 bits for Section I, 1 bit for Section II and 10 bits for Section III.

The stitch data shown in Section III are prepared in such a manner that a certain group of the stitch data shown in FIG. 3 portion (b) are combined together. More specifically, when the needle swing positions for a plurality of stitches are identical or are repeatedly changed, those stitch data are combined together. For example, the needle swing positions for the zeroth to the third stitches are all position 1, and these stitch data are combined to form a new code, 0000000001. The needle swing positions for the fourth to the sixth stitches are changed between positions 1 and 2 and these stitch data are also combined to form a new code 0000000011. The needle swing positions for the seventh to the eleventh stitches are also repeatedly changed between positions 4 and 5, and these stitch data are combined to form a new code 0000011000. The twelvth to the fourteenth stitches have the same needle swing positions or binary pattern and thus are combined together to form a new code 0000001000. The remaining needle swing position code words are derived in the same manner and are shown in the table in FIG. 3 portion (c) under Section III. It should be noted that the last code word 0000000000 indicates the end of stitch pattern data.

Section II indicates the direction in which each piece of digital information shown in Section III is read out. Specifically, a binary numeral "0" in Section II indicates that data information is read out from the tenth (or highest) bit to the first (or lowest) bit. On the other hand, a binary numeral "1" indicates that the data information is read out from the first bit to the tenth bit.

Section I indicates how many times digital information under Section III is read out. It should be noted that if a binary numeral "1" appears only once in each code under Section III (see data a1), a binary element "1" is always read out. On the other hand, if a binary numeral "1" appears twice or more (see data a2). the binary element "1" representing the first appearance after the direction in which the information is read out is reversed will not be read out. For example, data a1 "0000000001" are read out as follows: "0000000001"; "0000000001"; "0000000001"; and "0000000001". These data correspond to the stitch data for zero to the third stitches shown in FIG. 3 portion (b). By the same token, data a2 "0000000011" are read out as follows "0000000010"; "0000000001" and "0000000010", and correspond to the stitch data for the fourth to the sixth stitches. All the data a1 through a10 are stored in an address format in the stitch pattern memory 3.

Reference is now made to FIG. 2 in which a flow chart shows how the pattern is made based on the data shown in FIG. 3 portion (c). An operator first selects a stitch pattern, for instance that shown in FIG. 3(a), by means of the stitch pattern selector 1 (see block 20). This causes the data address generator 2 to generate an address signal which is used to access a particular location in the stitch pattern memory 3. Then, stitch data a1 (FIG. 3 portion (c) are, first, stored in the register 5 (see block 21). Thereafter, data information contained in Sections I, II and III is loaded into the read counter 6, the read direction indicator 7 and the search circuitry 8, respectively (see block 22).

When the stitch pattern is selected, the initial search circuitry 15 is enabled to actuate the search circuitry 8, thereby initiating processing of the data information. Then, the direction in which the information contained in Section III is read out is determined by the read direction indicator 7 (see block 23). As the code bit in Section II is "0⇌ (data a1), code "0000000001" in Section III is read out from the tenth bit (see blocks 23 to 25). The binary numeral of the tenth bit is "0", and search information is determined as being "OFF". The ninth bit is then read out (see block 28 to 31). This operation is performed until the first bit is read out. The binary numeral of the first bit is "1", and search information is thus determined as being "ON" (see block 28).

When data processing is initiated, the bit detector 9 detects whether each code includes only one "1" bit or two or more "1" bits. When two or more "1" bits are found, a control signal generated by the bit detector 9 is provided to the control circuitry 10 whereby the first "1" bit appearing after the read direction is reversed is cancelled or not read out.

Data a1 include only one "1" bit, and every "1" bit is thus read out in either read direction. Now, the counter 6 is set as "011 (decimal 3)" by subtracting 1 from the initial binary representation "100 (decimal 4)". Search "ON" information indicating needle swing position 1 for a zero stitch, is provided to the buffer 12, and this completes the first search (see blocks 37 to 39). Upon the actuation of stepper motor drive circuitry 13, the needle is moved to needle swing position 1. Thereafter, the sewing machine is operated to put a zero stitch on position 1.

A main shaft position detector 17 then generates a signal which represents the condition in which the needle is positioned below a workpiece holder (not shown). When this "lower needle" signal is applied to the system, the counter value detector 16 is enabled to detect whether or not the value in the counter 6 is zero. If not zero, the second search is carried out.

The counter 6 now shows "011", and the read direction indicator 7 shows "0" (see blocks 41 and 29). Meanwhile, the bit position detector 11 is enabled to detect whether or not search is being effected on either the tenth or first bit. If either the tenth or first bit is being read out, the read direction indicator 7 is enabled to instruct the change of direction in which data information is read out.

In the second search, the read direction indicator 7 is set as "1", and search will be effected from the first bit (see blocks 30, 26 and 27). The binary numeral for the first bit in stitch data a1 is "1", and search information is thus determined as "ON" (see block 28). The counter 6 is now set as "010 (decimal 2)" by subtracting 1 from the previous representation "011 (decimal 3)". The search "ON" information indicating the needle swing position 1 for the first stitch is provided to the buffer 12 (see blocks 37 to 39), and this completes the second search.

Data information of the needle swing position for the first stitch is the same as that for the zeroth stitch. In this case, the drive circuitry 13 is rendered inoperative. Thereafter, the sewing machine is operated to put a first stitch on position 1.

When the following "lower needle" signal generated by the main shaft position detector 17 is applied to the system, data information of stitch data for the second stitch is searched or read out. The counter 6 now shows "010 (2=0)", and the read direction indicator 7 shows "1" (see blocks 41 and 29).

The third search is effected from the second bit through the tenth bit (see blocks 29, 32, 33, 28, 29, 32 and 33). When the tenth bit is read out, the bit position detector 7 provides to the circuit 7 a signal which is used to set "0" bit, and the read direction is reversed (see blocks 32, 24 and 25). Reading is then effected to the first bit (see blocks 28, 29, 30 and 31). As the binary numeral for the first bit is "1", search information is determined as "ON" (see block 28). The counter 6 is then set as "001 (decimal 1)" by subtracting 1 from the previous representation "010 (decimal 2)", and search "ON" information is forwarded to the buffer 12 (see blocks 37 to 39). This completes the third search. In the same manner as earlier stated, data information of the needle swing position for the second stitch, namely position 1, is forwarded to the buffer 12, and the second stitch is put on position 1.

Upon application of a next "lower needle" signal to the main shaft position detector 17, the fourth search is carried out. The counter now shows "001 (1≠0)", and the circuitry 7 shows "0" (see blocks 41 and 29). Under these circumstances, the bit position detector 11 generates a signal which is provided to the circuitry 7. The circuitry 7 is then set as "1", and the fourth search is effected from the first bit (see blocks 30, 26 and 27). The binary numeral 1 for the first bit is "1", and search information is determined as "ON" (see block 28). The counter 7 is then set as "000 (decimal 0)" by subtracting 1 from the previous representation "001 (decimal 1)", and "ON" signal is provided to the buffer 12 (see blocks 37 to 39). This completes the fourth search, and the third stitch is put on position 1 in accordance with the same manner as earlier stated.

Upon application of a next "lower needle" signal to the system, the data address generator 2 generates an address signal so as to access a particular location in which stitch data a2 are stored. This is because "000" information is provided to the counter value detector 16. The stitch data a2 is then stored in the register 5 (see blocks 40, 41 and 21). Data information in Sections I, II and III is loaded into the counter 6, the read direction indicator 7 and the bit position detector 8, respectively (see block 22).

The stitch data a2 are now processed as follows: The binary numeral presented in Section II is "0" and reading is thus effected from the tenth bit (see blocks 23, 24 25 and 28). Subsequent reading (see blocks 28, 29, 30, 31 and 28) reveals that a binary numeral "1" appears first on the second bit. When the second bit "1" is read out, search information is determined as "ON" (see block 28). Then, the counter is set as "010 (decimal 2)" by subtracting 1 from the previous representation "011 (decimal 3", and the "ON" information is forwarded to the buffer 12 (see blocks 37 to 39). This completes the first search. Thereafter, the stepper motor drive circuitry 13 is actuated to move the needle to position 2, and the fourth stitch is put thereon.

Upon application of a next "lower needle" signal to the system, data information of the stitch data for the fifth stitch is processed. The counter now shows "010", and the circuitry 7 shows "0" as no signal is provided from the bit position detector 11 (see blocks 41 and 29). In this condition, the second search is now carried out. The first bit is read out because of shifting search bit position to the right (see blocks 31 and 28). The binary numeral of the first bit is "1", and search information is thus determined as "ON" (see block 28). The counter 6 is now set as "001 (decimal 1)" by subtracting 1 from the previous representation "010 (decimal 2)", and the "ON" information is forwarded to the buffer 12 (see blocks 37 to 39). This completes the second search. Thereafter, actuation of the stepper motor drive circuitry 13 causes the needle to be moved to position 1, and the fifth stitch is put thereon.

Upon application of a next "lower needle" signal to the system, data information of the stitch data for the sixth stitch is processed. The counter 6 now shows "001", and the indicator 7 shows "0" (see blocks 41 and 29). The third search is effected from the first bit. To this end, a signal generated by the bit position is provided to the read direction indicator 7 so as to instruct a change of the direction in which the data information is read out. As a result, the binary numeral of the code in Section II is changed to "1", and the search is effected from the lowest or first bit (see blocks 30, 23, 26, 27 and 28). The binary numeral of the first bit in the code under Section III is "1", and search information is thus determined as "ON" (see block 28). At this time, the bit detector 9 detects that the number of the binary numeral "1" contained in the code under Section III is more than two (see block 35). Further, the control circuitry 10 is enabled to detect whether or not search information is "ON" relative to a bit right after the read or search direction has been reversed (see block 36). In this instance, the search information is "ON" and, therefore, is cancelled (see block 36). The next search is then effected on the second bit (see blocks 29, 32 and 33. The binary numeral of the second bit in the code under Section III is "1", and search information is determined as "ON" (see block 28). The counter 6 is now set as "000 (decimal 0)" by subtracting 1 from the previous representation "001 (decimal 1)", and the "ON" information is forwarded to the buffer 12 (see blocks 37 to 39). This completes the third search. Thereafter, the stepper motor drive circuitry 13 is actuated to move the needle to position 2, and the sixth stitch is put thereon.

When a next "lower needle" signal is generated by the main shaft position detector 17 and provided to the system, since the contents of the counter value detector is "000", the data address generator 2 provides a signal which is used to access a particular location in which data a3 is stored (see blocks 40, 41 and 21). Data information contained in Sections I, II and III is then forwarded to the counter 6, the circuitry 7 and the search circuitry 8, respectively (see block 22).

Data information a3 under Section III is now processed as follows: A binary numeral in the code under Section II is "1", and search thus begins with the first bit (see blocks 23, 26, 27 and 28). This search is carried out in accordance with instructions shown in blocks 28, 29, 32, 33, 28. When the fourth bit is searched or read out, search information is determined as "ON" as the binary numeral of the fourth bit is "1" (see block 28). The counter 6 is now set as "100 (decimal 4)" by subtracting 1 from the previous representation of "101 (decimal 5)", and the "ON" information indicating the needle swing position 4 for the seventh stitch is forwarded to the buffer 12 (see blocks 37 to 39). This completes the first search of the data information a3 under Section III. Thereafter, the drive circuitry 13 is actuated to move the needle to position 4, and the seventh stitch is put thereon.

When a next "lower needle" signal is generated by the main shaft position detector 17 and then provided to the system, data information of the stitch for the eighth stitch is processed. The counter 6 now shows "100" (4≠0), and the circuitry 7 shows "1" (see blocks 41 and 29).

The second search will now be effected from the fifth bit because of shifting search bit position to the left (see blocks 33 and 28). The binary numeral of the fifth bit in the code under Section III is "1", and search information is thus determined as "ON" (see block 28). The counter 6 is then set as "011 (decimal 3)" by subtracting 1 from the previous representation of "100 (decimal 4)", and the "ON" information is forwarded to the buffer 12 (see blocks 37 to 39). This completes the second search. Thereafter, the drive circuitry 13 is actuated to move the needle to position 5, and the needle penetration of the eighth stitch is effected thereon.

Likewise, data information of the stitch data for the ninth stitch is processed when a next "lower needle" signal from the circuitry 17 is applied to the system. The counter 6 now shows "001" (3≠0), and the indicator 7 shows "1" (see blocks 41 and 29). Search will be effected from the sixth bit to the tenth bit in accordance with instructions shown in 29, 32, 33, 28, 29, 32 and 33. When the bit position detector 11 detects that the tenth bit is being searched, the detector 11 generates a signal which is provided to the indicator 7. As a result, the code in the indicator 7 is changed to "0", and the direction in which the data information is being searched is reversed (see blocks 32, 24 and 25). Then, search is subsequently effected until the fifth bit (see blocks 28, 29, 30, 31 and 28). The binary numeral of the fifth bit in the code under Section III is "1", and search information is thus determined as "ON" (see blocks 28). As previously stated, "1" bit of the first appearance after the direction in which data information is being searched is reversed is to be cancelled (see blocks 35, 36 and 29). Search is then shifted to the next bit, namely the fourth bit. The binary numeral of the fourth bit is "1", and search information is thus determined as "ON" (see block 31 and 28).

The counter 6 is then set as "010 (decimal 2)" by subtracting 1 from the previous representation of "011 (decimal 3)", and the "ON" information is forwarded to the buffer 12 (see blocks 37 to 39). This completes the third search. Thereafter, the drive circuitry 13 is enabled to move the needle to the position 4, and the needle penetration of the ninth stitch is effected thereon.

The remaining data a4 to a10 are processed in the same manner as mentioned above, and after all the data has been processed, the "ᔓ" stitch pattern is completed.

FIGS. 4 to 13 shows a second embodiment of the present invention. As shown in FIG. 4, there are 64 possible needle swing positions. Obviously, a larger capacity is necessary to store 64-bit data information. This results in an increase in the processing time as well.

According to the second embodiment, stitch data are divided into a plurality of blocks, specifically, eight blocks, as is best seen in FIG. 5. Each block has two different kinds of data, large data and 8-bit small data.

FIG. 6 is a diagram for explaining the relationship between large data, small data and needle swing position. It is clearly understood that the needle swing position could be defined with one large data and one set of small data.

For example, needle swing position 1 is defined with large data "0" and the first bit of the 8-bit small data, needle swing position 9 is defined with large data "1" and the first bit of the 8-bit small data, needle swing position 10 is defined with large data "1" and the second bit of the 8-bit small data and the likes.

With reference to FIGS. 4, 6 and 7, the binary numeral "1" appearing in the code corresponds to the needle swing position for the needle penetration for each stitch, as in the first embodiment. For example, the needle swing position for the zero stitch is position 1, and thus, a binary numeral "1" is set in the first bit in the code as shown in FIG. 4. Therefore, each stitch data is defined as shown in FIG. 7.

As shown in FIG. 8, a certain group of small data (see FIG. 7) are combined together wherein a binary pattern is made the same or is regularly changed. The small data thus formed includes three different sections, namely Section I, II and III, as in the first embodiment.

As shown in FIG. 9, each of the large groups of data consists of 8 bits. The first to the third bits are used to represent a first piece of data information. The fourth to the sixth bits are used to represent a second piece of data information or instructions on how many times the first data information is to be read out. The seventh and eighth bits are used to provide an instruction bit. For example, when the instruction bit is "00", the first to third bits are used to provide the first data information, and the fourth to sixth bits are used to provide the second data information. When the instruction bit is "01", the first to third bits are used to provide the first data information, and the fourth to sixth bits are used to provide the instructions on how many times the first data information is to be read out.

FIG. 11 is a block diagram of the second embodiment. This system generally includes a small data processor 50, a large data processor 51 and data connector 52. The operation of the small data processor 50 is the same as that described for the first embodiment of FIG. 1, and the same reference numerals have been employed in regard the same elements.

The large data processor 51 includes an address generator 61 which is connected to the output of the stitch pattern selector 1. The output of the address generator 61 is connected to the input of a stitch pattern memory 62, the output of which is, in turn, connected to the input of a register 63. As shown, data information contained in the register 63 is further connected to a register 64, a register 65 and a counter 66. Reference numeral 67 designates a buffer, reference numerals 68 and 69 designate flip-flops, reference numerals 71 to 74 designate AND gates, and reference numerals 75 to 77 designate OR gates. These components are connected as shown in FIG. 11, and no detailed explanation will be provided here.

The data connector 52 includes a multiplier 85, an adder 86 and the stepper motor drive circuitry 13. The output of the buffer 67 is connected to the input of the multiplier 85, the output of which is, in turn, connected to the input of the adder 86. The output of the buffer 12 in the small data processor 50 is also connected to the input of the adder 86. The output of the adder 86 is connected to the input of the stepper motor drive circuitry 13.

FIGS. 12(I) and 12(II) show flowcharts of the second embodiment. The flowchart of FIG. 12(II) is the same as that described for the first embodiment of FIG. 2. Blocks 20 through 41 show a control routine, as in the first embodiment.

Operation of the large data processor 51 is as follows:

When an operator first selects a particular stitch pattern by means of the stitch pattern selector 1 (see block 89), this causes the address generator 61 to generate an address signal which is used to access a specific location in the stitch pattern memory 62. Then, the large data as shown in FIG. 10 are read out, and large data b1 are stored in the register 63 (see blocks 89 and 93). At this time, updating of large data address b1 is effected in the address generator 61 (see block 94).

As an instruction bit of the large data b1 stored in the register 63 is "01", the gate 81 is open, and read instruction "100" is set in the counter 66 (see block 101). When the OR gate 77 is also open, the first data information "000" in the register 64 is forwarded to the buffer 67, and subtraction of 1 from the value in the counter is performed (see blocks 102 and 103). The flip-flop 69 is set (see block 97) and the flip-flop 68 is reset (see block 98). This completes processing of the large data information for the zero stitch.

Processing of the small data information for the zeroth stitch is effected in the same manner as is done in the first embodiment (see blocks 20, 21, 22, 23, 24, 25, 28, 29, 30, 31, 28, 35, 36, 37, 38 and 39).

Large data "0" is multiplied by 8 in the multiplier 85, and this data is then added by the adder 87 to small data "1" for the zeroth stitch stored in the buffer. Then, the added data "1" indicating needle swing position 1 for the zero stitch is provided to the stepper motor drive circuitry 13 (see block 111). This completes the search for the zeroth stitch. The sewing machine is driven to effect the needle penetration on position 1.

Now, a "lower needle" signal is generated by the main shaft position detector 17. When this signal is provided to the system, data information of stitch data for the first stitch is processed. More specifically, when the "lower needle" signal is provided to the system, the AND gates 71 and 74 are open, and one (1) is subtracted from the value in the counter 66. Further, upon opening of the OR gate 77, the first data "000" is forwarded to the buffer (see blocks 90, 92, 98, 102, 103, 104 and 97).

Processing of small data for the first stitch in the small data processor 50 is performed in the same manner as that described in the first embodiment with respect to the corresponding stitch.

Large data "0" is multiplied by 8 in the multiplier 87, and this data is added by the adder 87 to small data "1" for the first stitch stored in the buffer 12. The added data "1" indicating needle swing position 1 is then provided to the stepper motor drive circuitry 13 (see block 111). This completes the search for the first stitch.

When a next "lower needle" signal is generated by the main shaft position detector 17 and then provided to the system, data information of stitch data for the second stitch is searched or processed in the same manner as described with respect to the first stitch.

Also, when a next "lower needle" signal is generated by the detector 17 and provided to the system, data information of stitch data for the third stitch is processed in the same manner as described with respect to the first stitch. In this process, the value in the counter 66 is subtracted to "000" (see block 104). This counter generates a signal which is used to reset the flip-flop 69.

When a next "lower needle" signal is generated by the main shaft position detector 17 and is then provided to the system, data information of stitch data for the fourth stitch is processed. Specifically, in the large data processor 51, large data b2 stored in the stitch pattern memory 62 are read out, and is then stored in the register 63. This causes updating of the address in the address generator 61 (see blocks 90, 92, 93 and 94). An instruction bit for the large data b2 is found "00" (see block 95). This causes the gate 77 to be open, and the first data "001" is forwarded to the buffer 67 (see block 96). In addition, the flip-flops 68 and 69 are set (see blocks 97 and 98).

Processing of small data for the fourth stitch in the small data processor 50 is performed in the same manner as that described for the first embodiment with respect to the corresponding stitch (see blocks 40, 41, 21, 22, 23, 26, 27, 28, 29, 30, 31, 28, 35, 37, 38 and 39).

Large data "1" for the fourth stitch is multiplied by 8 in the multiplier 85, and this data is added by the adder 87 to small data "1" for the fourth stitch stored in the buffer 12. The added data indicating the needle swing position 9 for the fourth stitch is provided to the stepper motor drive circuitry 13 (see block 111). This completes the search for the fourth stitch.

When a next "lower needle" signal is generated by the main shaft position detector 17 and is then provided to the system, data information of stitch data for the fifth stitch is processed. The AND gates 71 and 73 as well as the gate 83 are open, and the second data "000" is forwarded to the buffer 67 (see blocks 90, 92, 98 and 99). The flip-flop 69 is also reset.

Processing of small data for the fifth stitch in the small data processor 50 is performed in the same manner as that described for the first embodiment in connection with the corresponding stitch.

Large data "0" for the fifth stitch is multiplied by 8 in the multiplier 85, and this data is then added by the adder 97 to small data "2" for the fifth stitch stored in the buffer 12. The added data indicating the needle swing position 2 for the fifth stitch is provided to the stepper motor drive circuitry 13 (see block 111). This completes the search for the fifth stitch. The system is then prepared to receive a signal from the main shaft position detector 17.

Data for the remaining stitches is processed in the same manner as previously described. Description has been given of data information on the positional coordinates for each stitch of a predetermined stitch pattern, it will be understood to those skilled in the art that the same concept is applicable to quantity of feeding for each stitch.

More specifically, work feed information includes 10 feed coordinates, 8 feed coordinates for a forward feed step and 2 feed coordinates for a negative or reverse feed step. Each feed code includes 10 bits corresponding to the number of feed coordinates. A binary numeral "1" appears in the feed code where work feed increment is required.

FIG. 13 shows feed information for producing the " ʃ " pattern. This feed information includes three different sections. Section III, stitch pattern data, has 10 bits, Section II has 1 bit indicating the direction in which the stitch data are read out, and Section I has 3 bits indicating how many times the stitch data are to be read out. The stitch data are read out in the same manner as earlier mentioned with reference to FIGS. 1 and 11, as well as FIGS. 2 and 12.

According to the present invention, the stitches for which each of the needle swing positions changes regularly are grouped to make a set of stitch data. If the number of needle swing positions is great, the stitch data is divided into a plurality of blocks and a set of stitch data is composed of "LARGE" data based on the number assigned to each of the blocks and "SMALL" data based on the data within each block. This composition is effective not only in reducing the capacity required for storing stitch data but also for shortening the time required to process the stitch data.

What is claimed is:

1. An electronic sewing machine in which is stored sewing data consisting of the needle sewing positions encoded for each stitch of a predetermined stitch pattern, said machine comprising:
    a memory means for storing at least sewing data consisting of a stitch data section (III) in which the stitches for which each of the needle swing positions changes regularly are encoded in group, and a stitch data read out time instructing section (I) which instructs the reading out of said stitch data section (III) by the number of times equal to the number of stitches encoded in group;
    a readout means for reading out stitch data for each stitch from the contents of said memory means in accordance with each stitch;
    a first means for changing the contents of said section (I) one by one when said readout means has read out one set of stitch data; and
    a second means for changing the needle swing position to a position corresponding to the output of said read out means.

2. An electronic sewing machine in which is stored sewing data consisting of the needle swing positions encoded in a plurality of bits for each stitch of a predetermined stitch pattern, said machine comprising at least:
    a first memory means for storing first data per stitch based on the number assigned to one of the blocks into which the encoded sewing data is divided and which contains the bit indicating said needle swing position;
    a second memory means for storing second data consisting of a stitch data section and a stitch data readout time instructing section which instructs the reading out of said stitch data section by the number of times equal to the number of stitches encoded in group, said stitch data section being obtained by such a method that the position of the bit indicating said needle swing position is encoded into another data in accordance with the number of bits in said block, and a group of stitches for which each of the needle swing positions changes regularly in said data are encoded in group into still other data;
    a first readout means for reading out said first data for each stitch from the contents of said first memory means in accordance with each stitch;
    a second readout means for reading out said second data for each stitch from the contents of said second memory means in accordance with each stitch;
    a first means for outputting said sewing data for each stitch from the contents of said first readout means and said second readout means; and
    a second means for changing the needle swing position to a position corresponding to the output of said first means.

* * * * *

UNITED STATES PATENT AND TRADEMARK OFFICE
CERTIFICATE OF CORRECTION

PATENT NO. : 4,905,619                      Page 1 of 2
DATED     : March 6, 1990
INVENTOR(S) : Iimura et al.

Figure 2B:
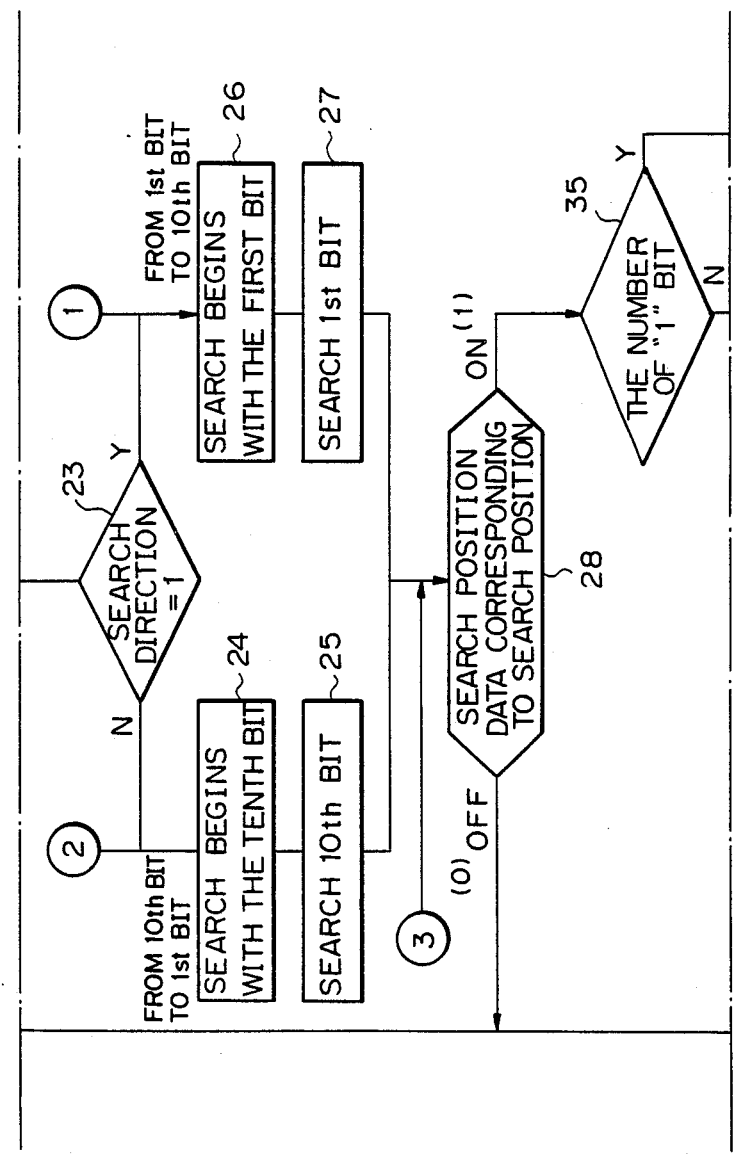
FIG. 2(b)
Figure 2C:
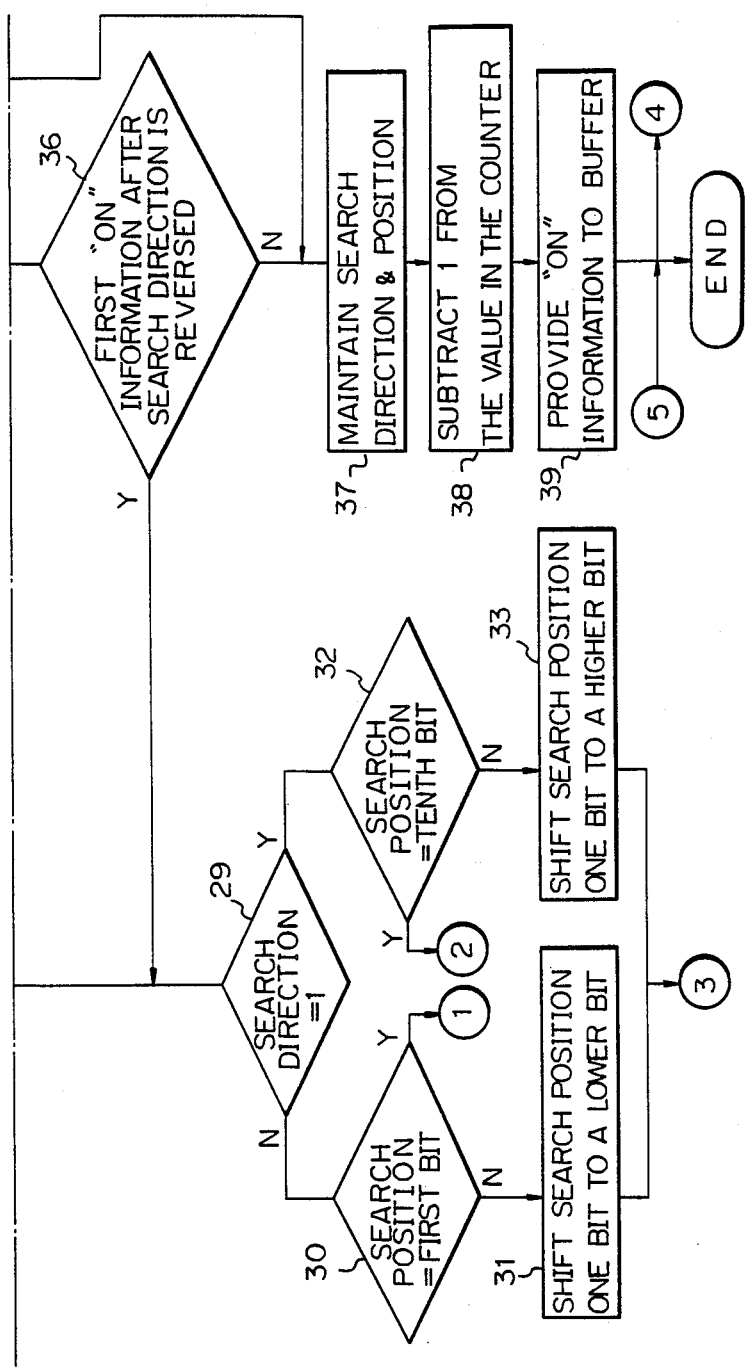
FIG. 2(c) is a flow chart for implementation in the first embodiment shown in FIG. 1.

It is certified that error appears in the above-identified patent and that said Letters Patent is hereby corrected as shown below:

Column 1, line 48, change line to read --FIG. 2 (FIG. 2(a); FIG. 2(b); and FIG. 2(c)) is a flow--.

Figure 11B:
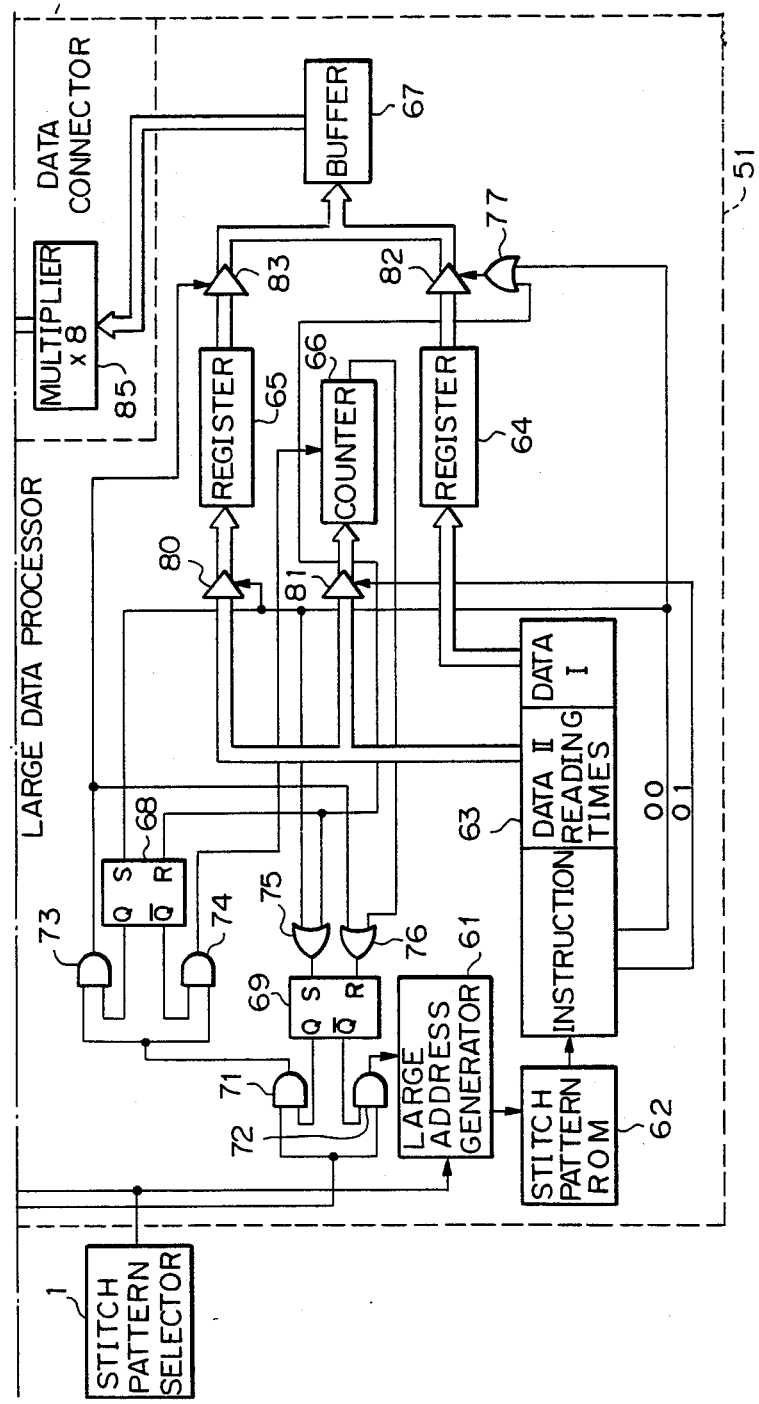

Column 1, line 67, change line to read --FIG. 11 (FIG. 11(a) and FIG. 11(b)) is a block dia---.

Column 2, line 2, after "12(II)-c", insert --)-- (closing parenthetical symbol).

Column 2, line 42, after "the", first occurrence, delete "." (period).

Column 3, line 23, change "twelvth" to --twelfth--.

Column 3, line 44, after "a2", change "." to --,-- (comma).

Column 4, line 9, after "0", delete "≠".

Column 5, line 48, after "24" insert --,--.

Column 5, line 55, after " 3" " insert --)-- (closing parenthetical symbol).

Column 6, line 31, after "33" insert --)-- (closing parenthetical symbol).

Column 7, line 33, change "blocks" to --block--.

Column 7, line 40, change "block" to --blocks--.

Column 7, line 53, change "shows" to --show--.

UNITED STATES PATENT AND TRADEMARK OFFICE
CERTIFICATE OF CORRECTION

PATENT NO. : 4,905,619
DATED : March 6, 1990
INVENTOR(S) : Iimura et al.

It is certified that error appears in the above-identified patent and that said Letters Patent is hereby corrected as shown below:

Column 8, line 4, change "likes" to --like--.

Column 8, line 39, after "regard" insert --to--.

Column 9, line 21, change "zeroth" to --zero--.

Column 9, line 26, change "zeroth" to --zero--.

Column 9, line 30, change "zeroth" to --zero--.

Column 10, line 12, after "28," change "29" to --39--.

Column 11, line 30, change "read out" to --readout--.

Signed and Sealed this

Twelfth Day of May, 1992

Attest:

DOUGLAS B. COMER

Attesting Officer

Acting Commissioner of Patents and Trademarks